United States Patent
Borrelli et al.

(10) Patent No.: US 6,773,635 B2
(45) Date of Patent: Aug. 10, 2004

(54) UV-SENSITIVE MATERIAL

(75) Inventors: Nicholas F. Borrelli, Elmira, NY (US); Lauren K. Cornelius, Painted Post, NY (US); Dennis W. Smith, Corning, NY (US); Paul A. Tick, Corning, NY (US)

(73) Assignee: Corning Incorporated, Corning, NY (US)

( * ) Notice: Subject to any disclaimer, the term of this patent is extended or adjusted under 35 U.S.C. 154(b) by 287 days.

(21) Appl. No.: 09/793,368

(22) Filed: Feb. 26, 2001

(65) Prior Publication Data

US 2001/0011718 A1 Aug. 9, 2001

Related U.S. Application Data

(63) Continuation of application No. 09/167,754, filed on Oct. 7, 1998, now abandoned.
(60) Provisional application No. 60/062,243, filed on Oct. 17, 1997.

(51) Int. Cl.[7] .................................................. H01B 1/02
(52) U.S. Cl. ................. 252/518.1; 252/500; 252/519.5; 252/519.54; 252/520.5; 252/521.1; 252/521.2; 252/521.3; 252/521.6; 385/144; 385/147; 501/37; 501/76; 501/79
(58) Field of Search ............................ 252/500, 518.1, 252/520.5, 521.2, 521.1, 521.3, 521.6, 519.5, 519.54; 385/147, 144; 501/37, 76, 79

(56) References Cited

U.S. PATENT DOCUMENTS

| 5,483,628 A | 1/1996 | Borrelli et al. |
| 5,537,505 A | 7/1996 | Borrelli et al. |
| 5,973,865 A | 10/1999 | Havens et al. |

OTHER PUBLICATIONS

U.S. patent application Ser. No. 09/130,800, Bartholomew et al., filed Aug. 7, 1998.

U.S. patent applicaiton Ser. No. 09/081,856, Bange et al., filed May 19, 1998.

Miura et al., "Optical Properties in Cadmium Borosilicate Glasses," *Collected Papers, XIV Intl. Congr. on Glass*, pp. 139–146 (1986).

Primary Examiner—Charles Boyer
Assistant Examiner—Derrick G. Hamlin
(74) Attorney, Agent, or Firm—Walter M. Douglas; Rogalskyj & Weyand, LLP

(57) ABSTRACT

Materials, both glass and glass-ceramic, that exhibit UV-induced changes in light transmission and electrical conductivity behavior. The materials consist essentially, in mole %, of 20–40% $SiO_2$, 10–20% $AlO_{1.5}$, 35–55% $SiO_2$+$AlO_{1.5}$, at least 30% $CdF_2$, 0–20% $PbF_2$, and/or $ZnF_2$, 0–15% rare earth metal fluoride, and 45–65% total metal fluorides.

15 Claims, 2 Drawing Sheets

UV-SENSITIVE MATERIAL

The present application is a continuation of U.S. patent application Ser. No. 09/167,754, filed Oct. 7, 1998, now abandoned, which claims the benefit of U.S. Provisional Patent Application Serial No. 60/062,243, filed Oct. 17, 1997.

FIELD OF THE INVENTION

Materials that exhibit UV-induced light transmission and electrical conductivity behavior.

BACKGROUND OF THE INVENTION

Glasses that exhibit photochromic behavior have become well-known since their original introduction thirty-five years ago as phototropic glasses. Such glasses are activated, and caused to darken, by absorption of UV radiation.

Initially, photochromic glasses contained silver halide, other than fluoride, crystals as the UV responsive ingredient in an aluminosilicate base glass. Subsequently, glasses containing copper and/or cadmium halides, rather than silver, were discovered to be photochromic. Other materials, including a cadmium borosilicate glass family, have been described as exhibiting photochromic behavior. The commercial product has remained the silver halide-containing glass, however.

Transparent glass-ceramics having a metal fluoride crystal phase have recently been described as hosts for rare earth ions such as praseodymium ($Pr^{+3}$). Such materials are used to produce opto-electronic devices, such as waveguide fibers, amplifiers and lasers. The present invention is predicated on discovery that the compositions of undoped, precursor glasses for these glass-ceramics can be modified to produce glasses exhibiting unusual behavior. In particular, glasses having such modified compositions exhibit UV-induced changes in light transmission and electrical conductivity. This unusual behavior is also observed in the glass-ceramic state.

It is a purpose of the invention to provide a unique material that exhibits these unusual effects in the glassy state, as well as in the glass-ceramic state.

It is a further purpose to provide articles that exhibit these UV-induced changes.

A still further purpose is to provide a method of producing such unique articles.

PRIOR ART

Prior literature of possible interest is supplied separately.

DESCRIPTION OF THE INVENTION

Transparent glass-ceramic materials, characterized by a metal fluoride crystal phase in an aluminosilicate glassy matrix, have been described in the art. These glass-ceramics are produced from oxyfluoride, precursor glasses. The glasses are composed essentially of silica, alumina and fluorides of cadmium, lead and/or zinc, and one or more rare earth metals. Small amounts of numerous other compatible oxides and fluorides are optional. The glasses are converted to the glass-ceramic state in the usual manner, that is, by developing a portion of the glass as a crystal network throughout the glass body.

The present invention arose from our surprising discovery that a behavior akin to photochromism can be produced in the precursor glasses of the glass-ceramics by only a relatively minor change in the glass composition. The precursor glass compositions are described as an aluminosilicate containing 15–25% lead fluoride ($PbF_2$), 19–34% cadmium fluoride ($CdF_2$), 3–7% yttrium or a rare earth metal fluoride with 3–7% zinc fluoride ($ZnF_2$) optional.

We have found that, if the $PbF_2$ content is limited to less than 20%, preferably to less than 15%, and the $CdF_2$ content is at least 30%, the resulting glass is capable of being darkened in response to ultraviolet exposure. The $PbF_2$ may be totally omitted, if desired, with the reduced content being compensated by an increase in $CdF_2$ content. This gives rise to the belief that the unusual behavior is associated with the cadmium ion in the glass.

The glass darkens upon exposure to ultraviolet radiation in a manner similar to photochromic behavior. However, removal of the activating radiation results in very slow fading at ambient temperature. The recovery is no more than 5–10% in a period of two hours. The glass can be completely bleached to its original transmission by heating to 150–200° C. for an hour.

The glass, as made, exhibits the unusual behavior. The heat treatment required for known photochromic glasses is not required. The glass can be heat treated, however, without loss of the behavior. For example, the glass may be heated to 500° C. to provide a glass-ceramic state having a fluoride crystal phase in an aluminosilicate glassy matrix.

Figure 1:
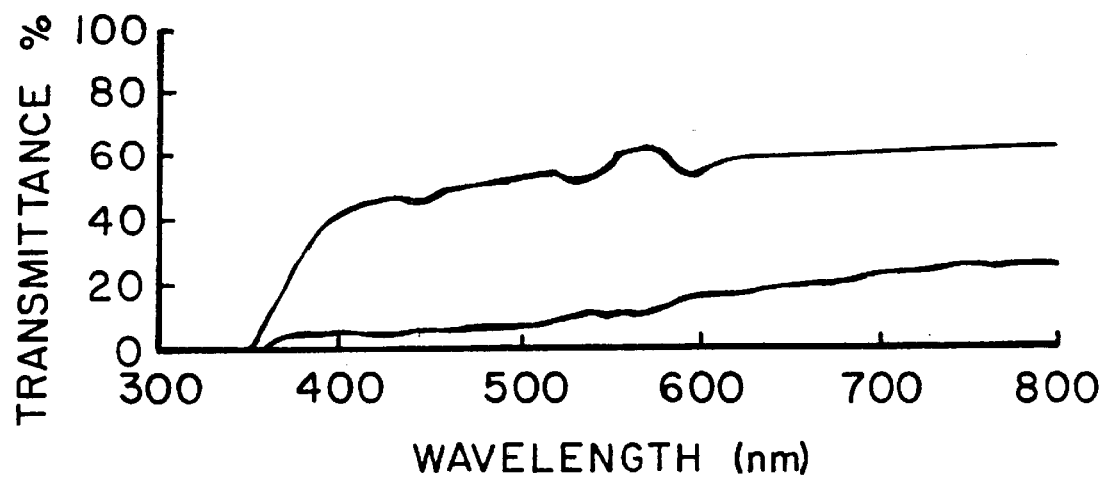
FIGS. 1 and 2 are graphical representations of transmittance curves for glasses in accordance with the invention in the UV darkened, and in the thermally bleached, states.
Figure 2:
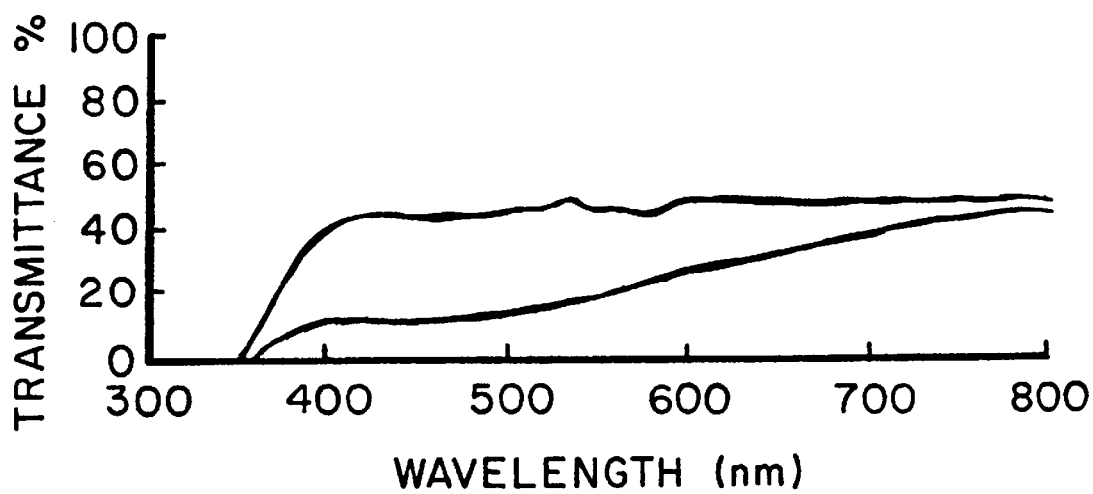

This unique behavior is illustrated in FIGS. 1 and 2. There, transmittance in percent is plotted on the vertical axis and wavelength in nm is plotted on the horizontal axis. The material upon which measurements were made has the composition shown in Example 9 of TABLE II, infra.

FIG. 1 is based on transmittance measurements made on the glass as made, that is, without further treatment. In FIG. 1, the lower curve B represents the transmittance curve for a 3.5 mm. thick, glass test piece exposed to UV radiation from a mercury lamp. The upper curve A represents the transmittance curve for the darkened glass after thermal bleaching at 200° C. for one hour.

FIG. 2 is based on transmittance measurements made on the glass material after a five hour heat treatment at 500° C. to develop the fluoride crystal phase. In FIG. 2, the lower curve $B^1$ represents the transmittance curve for a 3.5 mm. thick test piece of corresponding material in the glass-ceramic state after exposure to UV radiation from a mercury lamp as in FIG. 1 above. The upper curve $A^1$ represents the transmittance curve for the darkened test piece after it has been thoroughly bleached at 200° C. for one hour.

It is apparent that both the glass and glass-ceramic test pieces exhibit corresponding behavior. The glass, before ceramming, appears to darken more than the glass-ceramic, and to be a bit more susceptible to thermal bleaching. Either the darkened glass, or the darkened glass-ceramic, will slowly bleach after removal of the activating radiation. However, this bleaching is impractically slow.

Even more surprising was the finding that various glass-ceramics of the present invention exhibit increased conductivity in the darkened state. This means that the electrical resistance decreases when the glass-ceramic is exposed to activating UV radiation.

It has further been observed that the present glasses and glass-ceramics exhibit an intrinsic fluorescence. This occurs when the material is excited by radiation at 390 nm. The emission occurs at about 420 nm. This is in the region of the spectrum where darkening is effected. This suggests that the three phenomena stem from a common source, possibly a function of cadmium ions.

In terms of numerical ranges, the present glasses consist essentially, in mole percent as calculated from the batch, of: $SiO_2$ 20–40%, $AlO_{1.5}$ 10–20%, $SiO_2+AlO_{1.5}$ 35–55%, $CdF_2$ 30–50%, 0–20% $PbF_2$ and/or $ZnF_2$, and 0–15% rare earth metal fluorides, the total fluoride content being 45–65%. Optionally, other oxides and fluorides may be present in minor amounts to the extent they do not substantially alter the characteristic properties of the materials. The $SiO_2+AlO_{1.5}$ content furnishes the glassy matrix in the present composition. The metal fluorides, primarily the cadmium, provide the active elements of the invention.

At least 30 mole % $CdF_2$ is necessary to obtain the characteristic effects on light transmission and electrical conductivity. Up to about 20% $PbF_2$ and/or $ZnF_2$, preferably not over 15%, may be incorporated in the glass. While cadmium is the critical fluoride to the invention, either lead or zinc fluoride may serve a useful purpose as described subsequently.

At least 2–3% of $y^{13}$ or a rare earth metal fluoride is required if it is desired to ceram a glass. The tolerable amount depends on the element involved. Thus, up to about 10% yttrium or gadolinium fluoride is contemplated, whereas larger amounts of lutetium or ytterbium fluoride may be used.

The invention is further described with respect to specific embodiments.

TABLES I and II below record a number of glass compositions, expressed in terms of mole percent, illustrating the present invention.

TABLE I

| | 1 | 2 | 3 | 4 | 5 | 6 |
|---|---|---|---|---|---|---|
| Composition | | | | | | |
| $SiO_2$ | 30 | 30 | 30 | 30 | 30 | 30 |
| $AlO_{1.5}$ | 15 | 15 | 15 | 15 | 15 | 15 |
| $PbF_2$ | 15 | 15 | 10 | 10 | 5 | 5 |
| $CdF_2$ | 35 | 35 | 40 | 40 | 45 | 45 |
| $GdF_3$ | 5 | 5 | 5 | 5 | 5 | 5 |
| Pr, ppmw | 142 | 142 | 147 | 147 | 153 | 153 |
| post treatment (C/min/atm) | as made | 500/60/ air | as made | 500/60/ air | as made | 500/60/ air |
| Photochromic Properties | | | | | | |
| $T_o$, % (450 nm) | 82 | 71 | 82 | 78 | 80 | 72 |
| $T_d$, % | 34 | 33 | 34 | 28 | 40 | 28 |
| $T_{f5}$, % | 38 | 38 | 35 | 32 | 40 | 30 |
| $T_{f15}$, % | 40 | 39 | 36 | 34 | 40 | 32 |
| $T_{f60}$, % | 42 | 42 | 38 | 38 | 42 | 35 |
| Log R (ohm-cm) | | | | | | |
| bleached | 15.23 | 15.59 | 14.81 | 15.34 | 14.74 | 15.43 |
| darkened | 13.93 | 12.36 | 14.71 | 14.15 | 14.68 | 15.05 |

Note:
Pr content present only because of its inclusion in glass for an extraneous purpose. A further melt without it showed that it had no influence on properties of the present invention.

TABLE II

| | 7 | 8 | 9 | 10 | 11 | 12 |
|---|---|---|---|---|---|---|
| Composition mole % | | | | | | |
| $SiO_2$ | 30 | 30 | 30 | 30 | 30 | 30 |
| $AlO_{1.5}$ | 15 | 15 | 15 | 15 | 15 | 15 |
| $PbF_2$ | — | — | 5 | 15 | 15 | — |
| $CdF_2$ | 45 | 45 | 41 | 30 | 30 | 55 |
| $GdF_3$ | 5 | 5 | — | 5 | 5 | — |
| $ZnF_2$ | 5 | 5 | 5 | 5 | 5 | — |
| $YF_2$ | — | — | 4 | — | — | — |
| Pr, ppmw | 163 | 163 | 195 | — | — | — |
| Thermal History | | | | | | |
| post treatment (c/min/atm) | as made | 50/60/ air | as made | as made air | 450/60/ air | as made |
| Photochromic Properties | | | | | | |
| Thickness, mm. | 2.4 | 2.5 | 3.85 | 2.8 | 2.8 | — |
| $T_o$, % (450 nm) | 84 | 76 | 66 | 72 | 71 | — |
| $T_d$, % | 62 | 58 | 39 | 58 | 42 | — |
| bleached | 13.67 | 11.92 | 14.55 | 14.09 | 14.73 | 15.18 |
| darkened | 12.28 | 11.83 | 13.77 | 13.87 | 14.51 | 12.07 |

Batches in 30 gram lots, based on these compositions, were prepared from pure oxides and fluorides. The batches were tumbled to mix the components well, and then melted in covered, platinum crucibles. The crucibles were placed in a furnace operating at temperatures between 1000–1100° C. for thirty minutes.

Compounding, mixing and melting may be carried out in a glove box under dry nitrogen in the interest of safety. However, except for this concern, these glasses do not require melting under inert conditions, that is, may be melted in air.

After melting, most of the glasses appeared to be clear, moderately fluid, quiescent liquids. The molten glass was poured onto a steel mold having dimensions of 5×1×1 cm. to form test pieces. These pieces were then annealed, a careful anneal being required when the test piece was to be cut and polished for testing. When a glass-ceramic was to be produced, the heat of crystallization temperature was determined from a DSC curve. The glass sample was then heated to a temperature in the vicinity of this peak to convert the glass to the glass-ceramic state.

In addition to glass compositions, TABLES I and II present information regarding treatment and measured properties on glasses having these compositions. Certain test pieces that were measured without further treatment are designated "as made." Other test pieces were heated to 500° C. in air for sixty minutes to form a fluoride crystal phase. These test pieces are identified by "500/60/air."

The TABLES present darkening and fading properties as recorded at the 450 nm wavelength. The symbol $T_0$ designates the transmission of the material in the bleached, that is undarkened, state. $T_d$ shows the transmission of the material in the darkened state. $T_{f5}$, $T_{f15}$ and $T_{f60}$ represent transmission after fading times of 5, 15, and 60 minutes, respectively.

Molded test pieces were polished on opposite faces to provide samples for transmittance measurements. The polished samples, which were inherently darkened, were thoroughly bleached by heating at 150° C. for one hour. Transmittance measurements across the visible spectrum were made on this bleached sample employing a Varian/Cary 3E UV-VIS spectrophotometer. When plotted, these measurements established an undarkened, base line, transmission curve.

The sample was then darkened by exposure to a high intensity, mercury arc lamp for about fifteen minutes. The darkened sample was again placed in the spectrophotometer, and measurements made across the spectrum as before. This provided a darkened transmission curve.

Electrical conductivity was measured on darkened and undarkened (bleached) samples. Bleaching and darkening procedures employed were the same as described above for transmittance measurements. A small, circular, silver electrode was painted on one side of a sample and a larger, silver counter electrode was painted on the opposite side. Because of shading by the electrode, the results are not absolute values, but are satisfactory for comparative purposes. More precise measurements could be obtained using a transparent, ZnO, conducting electrode. In the TABLES, electrical measurements are shown as log R in Ohm-cm.

Figure 3:
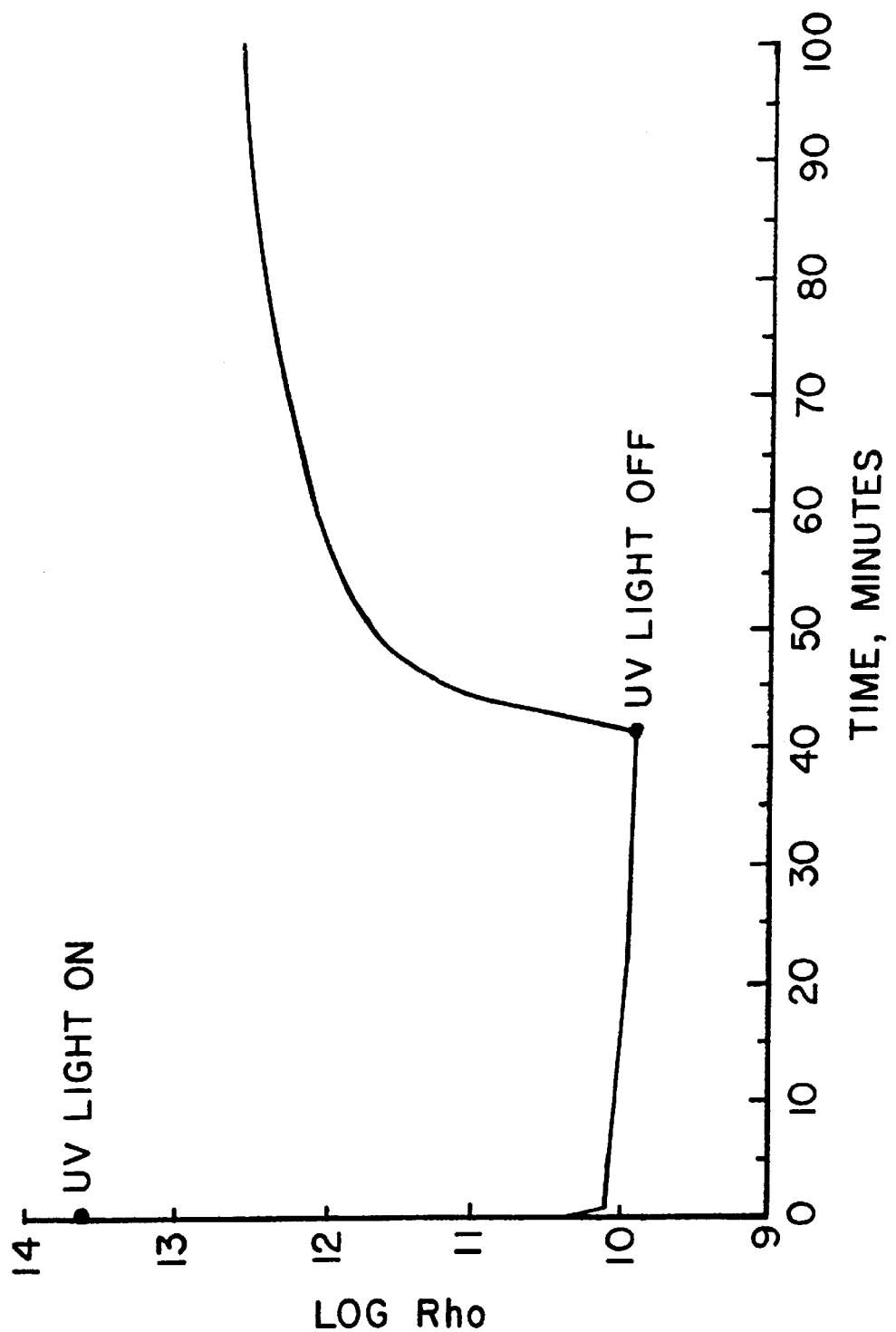
FIG. 3 is a graphical representation showing the effect of UV radiation on electrical resistivity in a material of the present invention.

FIG. 3 is based on electrical conductivity measurements made on a glass-ceramic sample having the composition of Example 2 in TABLE I. Conductivity is plotted on the vertical axis in terms of log R (Ohm-cm.). Time of treatment is plotted in minutes on the horizontal axis.

Samples were prepared with a transparent ZnO electrode on one surface and a silver counter-electrode on the opposite surface. Measurements were made while the sample was exposed to a black light for forty minutes, and then for an additional hour after the light was turned off.

The curve in FIG. 3 shows the immediate drop in resistivity when the UV light was turned on. The resistivity continued to decrease very gradually until the UV light was turned off after forty minutes. The resistivity then increased rather rapidly for about fifteen minutes. It then began to level off at a log R value between twelve and thirteen.

In summary, the light transmission effect is observed in $CdF_2$-rich compositions in the $SiO_2$—$Al_2O_3$—$CdF_2$—$PbF_2$—ReF glass family. All compositions with about 30 mole % $CdF_2$ or more, and no more than 20 mole % $PbF_2$, are subject to being darkened by UV radiation. Likewise, they all fade very slowly at ambient temperature, but can be thermally bleached. No apparent pattern of change with respect to transmission response was observed within the glass composition ranges.

The effect on electrical conductivity is largely observed in glass-ceramic material in the darkened state. While it appears to be dependent on the Cd ion, it is sensitive to the concentration of $PbF_2$. Before heat treatment, that is in the glass state, the conductivity underwent little or no change when the glass was darkened. In the cerammed state, that is glass-ceramic, a change of about three orders of magnitude was observed in a glass-ceramic having a composition containing about 15 mole % $PbF_2$. This change decreased as the $PbF_2$ content was decreased.

Both the transmission and conductivity responses to UV radiation changed when $ZnF_2$ was present in a composition. This is seen in the compositions of TABLE II. In general, the material did not darken as much when exposed to UV radiation. However, conductivity was observed to change as much, or more, in the "as made" (glass) state, as in the heat treated (glass-ceramic) samples.

The largest effect on conductivity occurred, however, when a sample having the composition of Example 9 was heat treated in $H_2$ at 500° C., a temperature above the glass $T_g$. A corresponding treatment in air also caused the glass to ceram, but did not have a corresponding effect on electrical conductivity.

The initial 500° C. hydrogen firing increased the conductivity of the sample ~4 orders of magnitude relative to the as-made sample. A subsequent 500° C. firing in air of the same piece did not change the conductivity. When a sample was initially fired at 500° C. in air, the conductivity decreased slightly. However, when the sample was subsequently fired in hydrogen at 500° C., the conductivity increased. This effect was greatest in darkened samples.

TABLE III sets forth resistivity data in terms of log R (ohm-cm) as measured on clear (bleached) and darkened samples of the Example 9 glass. Measurements were made on the untreated glass (as made), glass heat treated in H2, at 500° C. for one hour and then in air for an additional hour, and on glass heat treated in air at 500° C. for one hour and then an hour in hydrogen.

TABLE III

| Treatment | Log R (ohm-cm) | |
|---|---|---|
| | Clear | Dark |
| as made | 15.09 | 14.09 |
| $H_2$/500° C./60 | 11.30 | 10.56 |
| +air/500° C./60 | 11.29 | 10.29 |
| air/500° C./60 | 15.50 | 14.71 |
| +$H_2$/500° C./60 | 15.16 | 10.53 |

We claim:

1. A material that undergoes a decrease in light transmission when exposed to UV-radiation in either the glass or glass-ceramic state, that is thermally bleachable after darkening, and that consists essentially of an aluminosilicate based glass containing $CdF_2$.

2. A material in accordance with claim 1 in which the composition consists essentially of, as calculated from the batch, 20–40 mole % $SiO_2$, 10–20 mole % $AlO_{1.5}$, 33–55 mole % $SiO_2$+$AlO_{1.5}$, at least 30 mole % $CdF_2$, 0–20 mole % of zinc and/or lead fluoride and 0–15 mole % of a rare earth metal fluoride, the total metal fluoride being 45–65 mole %.

3. A material in accordance with claim 2, in which the composition additionally contains up to 15 mole % $PbF_2$.

4. A material in accordance with claim 2 wherein the composition additionally contains up to 15 mole % zinc fluoride.

5. A material in accordance with claim 2 wherein the composition contains at least 2 mole % of at least one rare earth metal fluoride selected from the group consisting of gadolinium, yttrium, ytterbium and lutetium fluorides.

6. A material in accordance with claim 2 wherein the $CdF_2$ is at least about 35 mole % in the absence of zinc and/or lead fluoride.

7. A material in accordance with claim 1, optionally containing Pb and/or Zn and/or rare earth metal fluorides in its composition.

8. A material according to claim 1, wherein said $CdF_2$ is present in an amount of at least 30 mole %.

9. A material according to claim 1, wherein said material has increased conductivity in the reduced light transmission state.

10. A glass or glass-ceramic article which exhibits UV-induced, light transmission and electrical conductivity behavior, the article having a composition consisting essentially of silica, alumina, and cadmium fluoride.

11. An article in accordance with claim 10, the article having a composition including at least 2 mole % of at least one fluoride selected from the group consisting of gadolinium, ytterbium, yttrium and lutetium fluorides.

12. An article in accordance with claim 10 wherein the composition contains up to 20 mole % of $PbF_2$ and/or $ZnF_2$.

13. An article in accordance with claim 10 in which the composition consists essentially of, as calculated from the batch, 20–40 mole % $SiO_2$, 10–20 mole % $AlO_{1.5}$, 33–55 mole % $SiO_2+AlO_{1.5}$, at least 30 mole % $CdF_2$, 0–20 mole % of zinc and/or lead fluoride and 0–15 mole % of a rare earth metal fluoride, the total metal fluoride being 45–65 mole %.

14. An article in accordance with claim 13 wherein the $CdF_2$ is at least about 35 mole % in the absence of zinc and/or lead fluoride.

15. An article in accordance with claim 10, the article having a composition that additionally contains up to 15 mole % $PbF_2$.

* * * * *